United States Patent
Müller

(10) Patent No.: US 7,346,743 B2
(45) Date of Patent: Mar. 18, 2008

(54) EXCLUDING A TOGGLE BIT FROM THE RANGE OF CACHEABLE ADDRESSES IN A FLASH MEMORY

(75) Inventor: Ralf Müller, Berlin (DE)

(73) Assignee: Francotyp-Postalia GmbH (DE)

( * ) Notice: Subject to any disclaimer, the term of this patent is extended or adjusted under 35 U.S.C. 154(b) by 251 days.

(21) Appl. No.: 11/321,879

(22) Filed: Dec. 29, 2005

(65) Prior Publication Data
US 2006/0174064 A1    Aug. 3, 2006

(30) Foreign Application Priority Data
Dec. 29, 2004    (DE)    ................. 10 2004 063 757

(51) Int. Cl.
*G06F 12/00*    (2006.01)
(52) U.S. Cl. .................. 711/138; 711/103; 711/118
(58) Field of Classification Search .................. None
See application file for complete search history.

(56) References Cited

U.S. PATENT DOCUMENTS

| | | | | |
|---|---|---|---|---|
| 5,584,007 A | * | 12/1996 | Ballard | .......... 711/113 |
| 5,721,866 A | * | 2/1998 | Ballard | .......... 711/138 |
| 5,963,981 A | * | 10/1999 | Martin | .......... 711/170 |
| 6,219,745 B1 | * | 4/2001 | Strongin et al. | .......... 711/100 |
| 6,587,928 B1 | * | 7/2003 | Periyannan et al. | ........ 711/138 |
| 7,092,301 B2 | * | 8/2006 | Suzuki | .......... 365/189.12 |
| 2004/0264261 A1 | * | 12/2004 | Suzuki | .......... 365/189.12 |
| 2005/0240719 A1 | * | 10/2005 | Suzuki | .......... 711/103 |

FOREIGN PATENT DOCUMENTS

WO    WO 03/027828    4/2003

* cited by examiner

*Primary Examiner*—Kevin Verbrugge
(74) *Attorney, Agent, or Firm*—Schiff Hardin LLP

(57) ABSTRACT

In a method and arrangement for manipulation of the contents of a data memory with which a processing device can be connected to manipulate (in at least one manipulation step at least one first memory range of the data memory, the processing device monitors a monitoring range of the first memory range, the state progression of which allowing the conclusion of the manipulation of the first memory range to be detected. A processing device with a buffer is used, into which buffer the data are read from the data memory. A sub-range of the data memory is established as a first exclusion range of the data memory. The first exclusion range not being read into the buffer. The first exclusion range is established in an establishing step preceding the manipulation step. The exclusion range includes the monitoring range.

30 Claims, 3 Drawing Sheets

EXCLUDING A TOGGLE BIT FROM THE RANGE OF CACHEABLE ADDRESSES IN A FLASH MEMORY

BACKGROUND OF THE INVENTION

1. Field of the Invention

The present invention concerns a method and arrangement for manipulation of the content of a data memory by a processing device that can be connected with the data memory to manipulate at least one first memory range of the data memory, the processing device monitoring a monitoring range of the first memory range, with a state progression thereof allowing termination of the manipulation of the first memory range to be detected.

2. Description of the Prior Art

In mobile applications or applications of particularly small construction, solid-state memories (such as, for example, flash memories) are frequently used. These flash memories have the advantage of being a non-volatile memory that is freely addressable like a volatile working memory, for example a RAM module.

Conventional flash memories are divided into a series of sectors that, as needed, can have different sizes. Although a blank flash memory normally can be written on a byte-by-byte basis for deletion (erasure) the entire sector must always be deleted. Upon re-writing such a flash memory, the entire appertaining sector therefore must initially be deleted before it can be re-written.

Should a flash memory be manipulated, for example deleted or written, the termination of the manipulation can be established using the state of what is known as the toggle bit of the appertaining sector. During the manipulation the state of the toggle bit continuously jumps back and forth. If the toggle bit assumes a temporally stable state, the manipulation is finished (concluded).

If a processing device in the form of a conventional processor with a cache memory as a buffer is used for manipulation of the flash memory, into which buffer the contents of the appertaining sector to be manipulated would normally be read, this cache memory normally must be deactivated upon manipulation of the appertaining sector. Only by this means, for monitoring, the toggle bit of the appertaining sector can actually be read (therewith detecting the actual completion of the manipulation) from the flash memory and not from the cache memory can be established. This has the disadvantage that the cache memory is at that point no longer available to support the execution of the manipulation process, such that a comparably long processing time results for the manipulation.

SUMMARY OF THE INVENTION

An object of the present invention is to provide a method and an arrangement of the previously cited type which do not exhibit the disadvantages described above, or at least exhibit the aforementioned disadvantages to a lesser degree, and in particular enable shorter processing times in the manipulation of the data memory.

Short processing times in the manipulation of the data memory are achieved in accordance with the invention by a method wherein a processing device with a buffer is used, into which buffer the data are read from the data memory, and wherein a sub-range of the data memory can be established as a first exclusion range of the data memory that is not read into the buffer, and wherein in an establishing step preceding the manipulation step, the first exclusion range is established such that it includes the monitoring range.

It is thus possible to use the buffer for fast execution of the manipulation event and simultaneously to reliably monitor the monitoring range of the of the data memory in order to detect the manipulation process as being concluded at a very early point in time, and to accordingly end it. Short processing time hereby results in the manipulation of the data memory.

In principle, the invention can be used in connection with arbitrary data memories in which the conclusion of a manipulation of a first memory range can be detected using the state of a monitoring range of the first memory range. It can particularly be used advantageously in connection with the manipulation of flash memories.

For example, if according to the invention, a processing device with cache memory is used for manipulation of a flash memory, in which cache memory a non-cacheable area can be established as the exclusion range, this non-cacheable area according to the invention is placed precisely over the monitoring range, thus for example the toggle bit of the current sector to be processed. The cache memory then can be used while the toggle bit of the current sector to be processed is read out, not from the cache memory but rather directly from the flash memory.

In principle, the inventive method can be used for arbitrary manipulations of a data memory. It is particularly advantageous for use in connection with deletion processes on the data memory since in that case, in addition to the fast execution of the deletion sequence in the processing device, a fast and reliable detection of the conclusion of the deletion process in the data memory is possible. Therefore, preferably at least one part of the first data (in particular all first data) stored in the first memory range are deleted from the first memory range.

As already mentioned, for achieving fast processing it is advantageous for the manipulation process to be concluded optimally quickly, i.e. it takes only as long as necessary. The monitoring range therefore is monitored and the first partial step of the manipulation step is ended as soon as the conclusion of the manipulation of the first memory range is detected upon monitoring of the monitoring range.

With the present invention it is also possible to manipulate only a part of the data of the first memory range. In order to avoid a data loss in the manipulation it is preferable for at least a part of the first data (in particular all first data) to be read out from the first memory range into a protective memory in a protection step preceding the manipulation. The protective memory can be either the buffer of the processing device or a separate memory, for example a working memory connected with the processing device. It can also be another memory range of the data memory.

A first part of the first data from the first memory range can be manipulated in the manipulation step while a second part of the first data from the first memory range remains unchanged. At least the second part of the first data is then read out from the first memory range into the protective memory in the protection step in order to avoid a data loss in the range of the second part of the first data (which part remains unchanged).

The present invention also can be advantageously used in connection with the writing of data into the first memory range. Therefore second data can be written into the first memory range in a second sub-step of the manipulation step.

In an embodiment of the inventive method with reliable and safe manipulation of only a part of the data of the first memory range, the second data are written into the first memory range in the second sub-step for manipulation of the first part of the first data, while the second part of the first data is written into the first memory range from the protective memory for reconstruction. In other words, the new content of the first memory range also can be assembled only from the new data and the unchanged old data components immediately upon writing.

For an optimally short processing time, it is also advantageous for the writing process to last only as long as necessary. The monitoring range therefore is preferably monitored and the second sub-step of the manipulation step is ended as soon as the conclusion of the manipulation of the first memory range is detected upon monitoring of the monitoring range.

Larger ranges of the data memory, up to the entire data memory, can also be quickly and simply manipulated with the present invention. If further second memory ranges of the data memory ranges are to be manipulated in addition to the first memory range, preferably at least the establishment step and the subsequent manipulation step are executed for the second memory range to manipulate a second memory range of the data memory.

In other words, the establishment step and the subsequent manipulation step are simply repeated for the appertaining second memory range. In particular, the exclusion range is established such that it includes the corresponding monitoring range of the second memory range.

In other variants of the invention, multiple or all memory ranges can be initially successively manipulated in a first manner (for example deleted) in a first manipulation sequence for manipulation of multiple memory ranges, and they can then be successively manipulated in a second manner (for example re-written) in a subsequent second manipulation sequence.

As mentioned above, the invention can in principle be used in connection with arbitrary memory ranges in which the conclusion of a manipulation of a first memory range can be detected using the state of a monitoring range of the first memory range. It can be used particularly advantageously in connection with the manipulation of solid-state memories that operate in that manner, in particular flash memories. A solid-state memory is therefore advantageously used as the data memory, preferably a flash memory, and whereby the first memory range is then a first sector of the flash memory. At least one toggle bit of the first sector is then advantageously monitored as the monitoring range.

The present invention in principle can be used in connection with any application in which a data memory is to be manipulated. It can be advantageously used in connection with franking machines. The processing device therefore is used as a component of a franking machine, in particular as a component of the security module of a franking machine.

The present invention furthermore concerns an arrangement for manipulation of the contents of a data memory having a data memory that contains at least one first memory range to be manipulated with a monitoring range, from a status progression thereof the conclusion of the manipulation of the first memory range can be detected, and with a processing device that can be connected with the data memory, the processing device manipulating the first memory range and monitoring the monitoring range. According to the invention, the processing device has a buffer. The processing device is furthermore fashioned to read data from the data memory into the buffer, and a sub-range of the data memory can be established as a first exclusion range that is not read into the buffer. The processing device establishes the first exclusion range before the manipulation of the first memory range such that the first exclusion range includes the monitoring range.

The inventive arrangement is suitable for implementation of the inventive method. The variants and advantages described above in connection with the method can be achieved with the arrangement to the same degree.

The processing device preferably is fashioned to delete at least a part of the first data stored in the first memory range (in particular all first data) from the first memory range. The inventive arrangement also advantageously ends the deletion process at the earliest possible point in time. The processing device therefore is fashioned to end the deletion process upon detecting the conclusion of the manipulation of the first memory range by the monitoring of the monitoring range.

In preferred variants of the inventive arrangement, a protective memory is provided. The processing device is then fashioned for effective saving of at least one part of the first data (in particular all first data) from the memory range to the protective memory before the manipulation of the first memory range. The processing device is advantageously fashioned for manipulation of a first part of the first data from the first memory range and to leave unaltered a second part of the first data from the first memory range. It is then additionally fashioned to save at least the second part of the first data into the protective memory.

The processing device is advantageously fashioned to write second data into the first memory range. For manipulation of the first part of the first data, the processing device is thereby preferably fashioned to write the second data into the first memory range. For reconstruction of the second part of the first data, the processing device is then fashioned to transfer the second part of the first data back from the protective memory into the first memory range.

The inventive arrangement also advantageously ends the write process at the earliest possible point in time. The processing device is therefore preferably fashioned to end the write process in the first memory range upon detecting the conclusion of the manipulation of the first memory range via the monitoring of the monitoring range.

DESCRIPTION OF THE PREFERRED EMBODIMENTS

Figure 1:
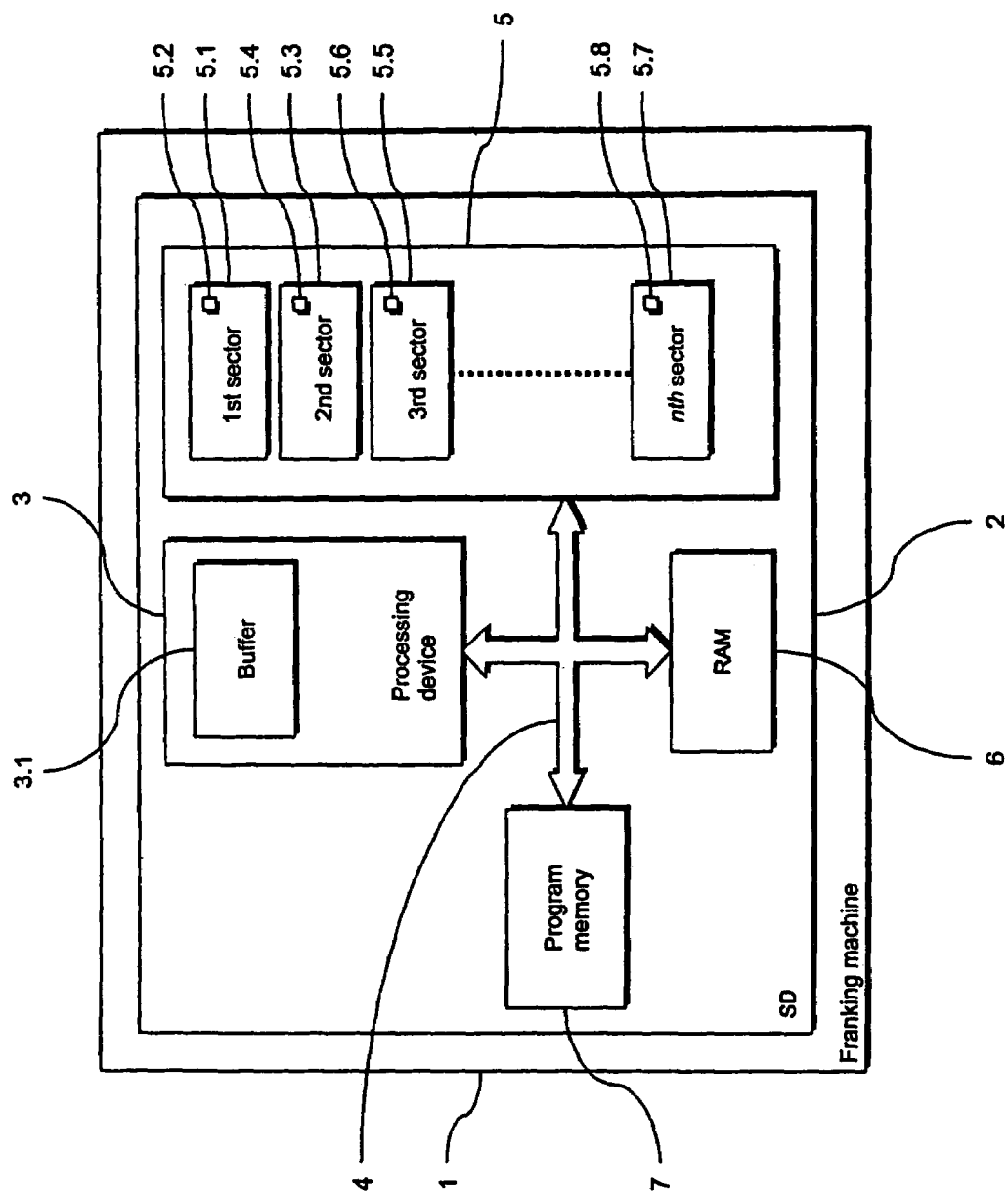
FIG. 1 is a schematic representation of a preferred embodiment of the inventive arrangement with which a preferred embodiment of the inventive method for manipulation of a data memory can be implemented.
Figure 2:
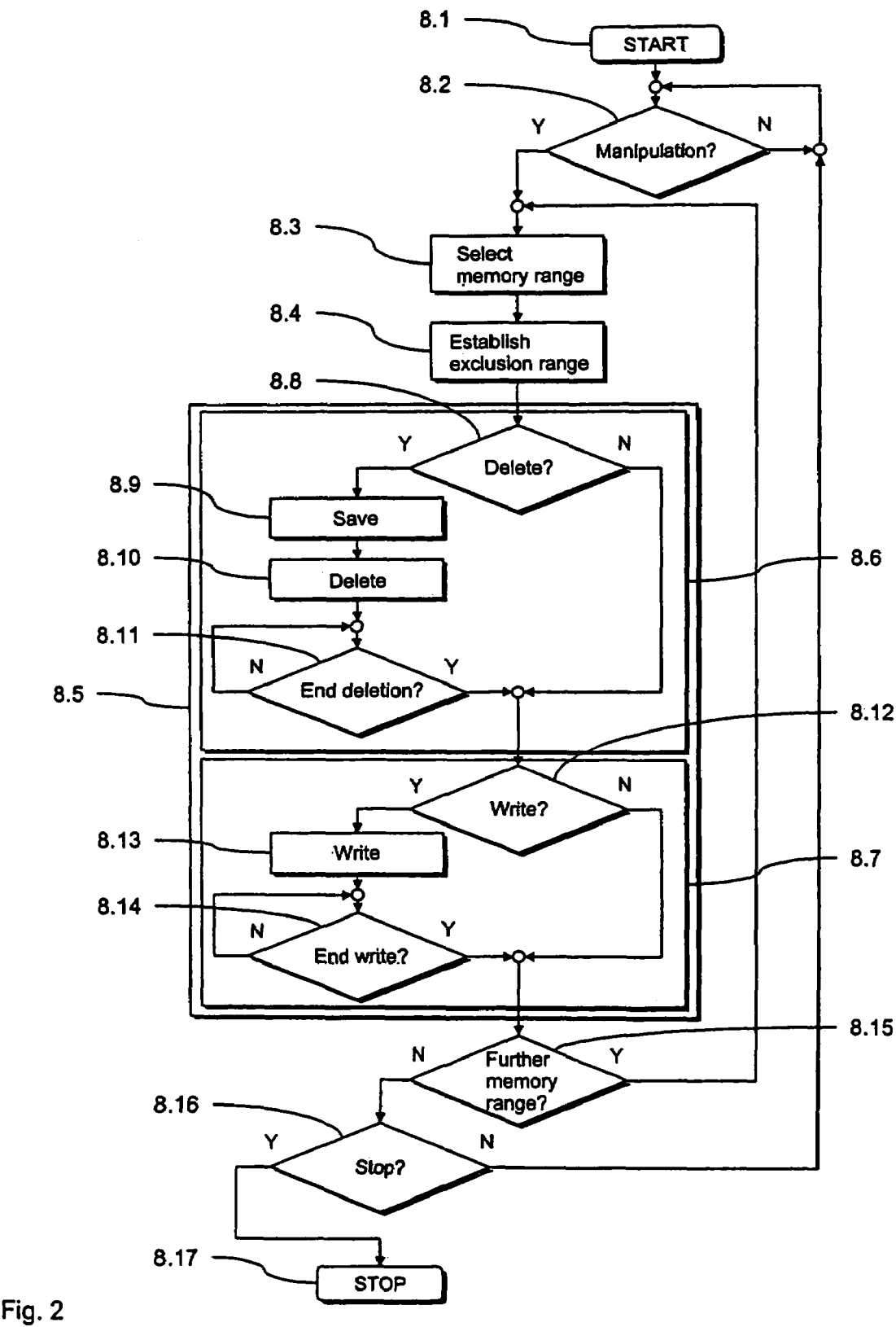
FIG. 2 is a flowchart of a preferred embodiment of the inventive method for manipulation of a data memory that is implemented with the arrangement of FIG. 1.

FIG. 1 schematically illustrates a franking machine 1 with a preferred embodiment of the inventive arrangement that is integrated into a security module 2 in the form of a PSD or SAD (for short an SD) of the franking machine 1. Among other things, the security module 2 implements a preferred embodiment of the inventive method for manipulation of a data memory as shown in FIG. 2.

The security module 2 has a processing device in the form of a RISC processor 3 with a buffer in the form of a cache memory 3.1. The process 3 is connected via a data bus 4 with a data memory in the form of a flash memory 5. Furthermore, the processor 3 is connected via the data bus 4 with a working memory 6 in the form of a RAM module and a program memory 7.

The flash memory 5 is a flash module with n memory ranges in the form of sectors 5.1, 5.3, 5.5, 5.7. The respective sectors 5.1, 5.3, 5.5, 5.7 of the flash module 5 have toggle bits 5.2, 5.4, 5.6, 5.8. These toggle bits 5.2, 5.4, 5.6, 5.8 continuously change state given a manipulation of the respective sectors 5.1, 5.3, 5.5, associated therewith. When the manipulation of the appertaining sector 5.1, 5.3, 5.5, 5.7 is concluded, the toggle bits 5.2, 5.4, 5.6, 5.8 assume a stable state.

Although only one memory module is used for the data memory 5 in the present example, it is understood that the data memory in other variants of the invention can be assembled from a number of memory modules, in particular a number of flash modules. Furthermore, it is understood that the memory ranges or sectors can have equal or different sizes.

If the content of the flash module 5 is to be manipulated, for example when specific data must be deleted or changed, the processor 3 accesses a corresponding program that is stored in the program memory 7. If new data should be written into the flash component 5, the new data are initially stored in the working memory 6.

The processor 3 is a processor in which an exclusion range can be variably established in the form of a non-cacheable area. This non-cacheable area is a selectable address range (for example in the flash module 5) that is not read into the cache memory 3.1 of the processor during the processing.

In the following, a preferred embodiment of the inventive method for manipulation of a data memory is described with reference to FIGS. 1 and 2, the method being implemented with the arrangement from FIG. 1.

The method workflow is started in a step 8.1. In a step 8.2, the processor 3 checks whether a manipulation of the flash module 5 is to be effected. The manipulation of the flash module 5 can be either a deletion or a writing of all or specific memory ranges of the flash module 5.

The manipulation of the flash module 5 can be initiated by an external command that is transferred to the processor 3 via an interface (not shown). Alternatively, an internal process in the security module 2 can trigger the manipulation of the flash module 5.

For example, if new data are to be written into the flash module 5 in the manipulation, the new data are initially stored in the working memory 6. The address of the new data (thus the source address, the length of the new data and the target address of the new data in the flash module 5) is subsequently transferred to a flash driver. This flash driver is realized in the processor 3, which for this purpose initially accesses a corresponding driver program in the program memory 7. In order to accelerate the processing, the processor 3 loads the required data into its cache memory 3.1.

In a step 8.3, the flash driver then initially determines which sector or sectors of the flash module 5 should be manipulated from the length of the new data and the target address of the new data in the flash module 5. The selection of the first memory range of the flash module 5 to be manipulated subsequently ensues via the processor 3. In the present example, this first memory range forms the first sector 5.1.

In an establishing step 8.4, the processor 3 establishes the exclusion range (thus the non-cacheable area) such that it includes the toggle bit 5.2 of the first sector 5.1. As described above, this means that the processor 3 does not read the toggle bit 5.2 into the cache memory during the processing. If the address of the toggle bit 5.2 is to be addressed so that the memory state thereof can be detected during the processing, the processor does not determine the corresponding value from the cache memory 3.1 but instead actually accesses the toggle bit 5.2 of the first sector 5.1 in the flash module 5.

The requested manipulation of the first memory range (thus of the first sector 5.1) then ensues in a subsequent manipulation step 8.5. For this purpose, a deletion process of the first data that are stored in the first sector 5.1 ensues in a sub-step 8.6 of the manipulation step 8.5. A write process in which data are written into the first sector 5.1, corresponding to the manipulation request, subsequently ensues in a second sub-step 8.7 of the manipulation step 8.5.

In a step 8.8 of the first sub-step 8.6 it is initially checked whether a deletion of data of the first sector 5.1 is required corresponding to the manipulation request. As was initially explained, only one complete sector of the flash module 5 must or can thereby be deleted. The deletion can be omitted when, for example, it is known that the first sector is already provided in a deleted state or has never been written to.

If a deletion of data of the first sector 5.1 is required but if overall only a first part of the first data of the first sector 5.1 are to be altered while a second part of the first data should remain unchanged, in a protection step 8.9 of the first sub-step 8.6 at least the second part of the first data is thus written into the cache memory 3.1 as a protective memory.

In order to avoid a data loss, for example given a failure of the deletion process etc., in the present case all first data are written into the cache memory 3.1. In the case of an error, the old state can be reconstructed in this manner. In other variants of the invention, only the second part of the first data need be saved.

The deletion of the first sector 5.1, for which a corresponding deletion sequence is transmitted to the flash module 5 by the processor 3, then ensues in a step 8.10 of the first sub-step 8.6.

In a step 8.11 of the first sub-step 8.6, the processor 3 checks whether the deletion process of the first sector 5.1 has concluded. For this purpose, it accesses the toggle bit 5.2 of the first sector 5.1. As explained above, this toggle bit 5.2 represents a monitoring range of the first sector 5.1, the state progression of which allows the conclusion of the deletion event to be detected.

The establishment of the exclusion range (thus the non-cacheable area) to include the toggle bit 5.2 of the first sector 5.1 (thus the monitoring range), that occurred in the establishing step 8.4, ensures that the processor 3 does not determine the corresponding value from the cache memory 3.1 but rather actually accesses the toggle bit 5.2 of the first sector 5.1 in the flash module 5.

If, using alternating states of the toggle bit 5.2, it is detected that the deletion process has not yet concluded, the deletion sequence is continued. Otherwise the processor 3 immediately ends the initiated deletion sequence and therewith the first sub-step 8.6.

A reliable, early detection of the conclusion of the deletion process thus is made possible, such that the processing can be ended at the earliest possible point in time. Moreover, the cache memory 3.1 (with its advantages with regard to the achievable processing speed) is available during the entire processing. Overall a processing speed thus is achieved that is normally at least twice as fast as the processing speed in the conventional methods with deactivation of the entire cache memory.

In a step 8.12 of the second sub-step 8.7, it is initially checked whether writing of data into the first sector 5.1 is required corresponding to the manipulation request.

If this is the case, a write sequence is initiated in a step 8.13 of the second sub-step 8.7. If overall only a first part of the first data of the first sector 5.1 should be altered while a second part of the first data should remain unchanged, the second data which replace the first part of the first data to be modified, and the second part of the first data that should remain unchanged are written into the first sector 5.1 in the framework of the write sequence. The second part of the first data is thereby reconstructed from the cache memory 3.1 as a protective memory.

In a step 8.14 of the second sub-step 8.7, the processor 3 checks whether the write process in the first sector 5.1 has concluded. Because of the specified establishment of the exclusion range (thus the non-cacheable area), for this purpose the processor again directly accesses the toggle bit 5.2 of the first sector 5.1 as a monitoring range.

If, using alternating states of the toggle bit 5.2, it is detected that the write process has not yet concluded, the write sequence is continued. Otherwise the processor 3 immediately ends the initiated write sequence and therewith the second sub-step 8.7.

A reliable, early detection of the conclusion of the write process thus is made possible, such that the processing can be ended at the earliest possible point in time. Moreover, the cache memory 3.1 (with its advantages with regard to the achievable processing speed) is available during the entire processing. Overall a processing speed is therefore achieved that is normally at least twice as fast as the processing speed in the conventional methods with deactivation of the entire cache memory.

In a step 8.15, the processor 3 then checks whether a further second memory range (thus a further sector 5.3, 5.5, 5.7) of the flash module 5 is to be manipulated according to the manipulation request. If this is the case, the workflow jumps back to step 8.3 in which the next sector 5.3, 5.5, 5.7 to be manipulated of the flash module 5 is then selected, for which next sector the steps 8.4 and 8.5 are then implemented.

All sectors of the flash module 5 to be manipulated according to the manipulation request are manipulated in this manner. If in the step 8.15 it was established that no further sector of the flash module 5 is to be manipulated, in a step 8.16 it is finally checked whether the method workflow should be ended. If this is the case, the method workflow ends in a step 8.17. Otherwise the workflow jumps back to the step 8.2.

Figure 3:
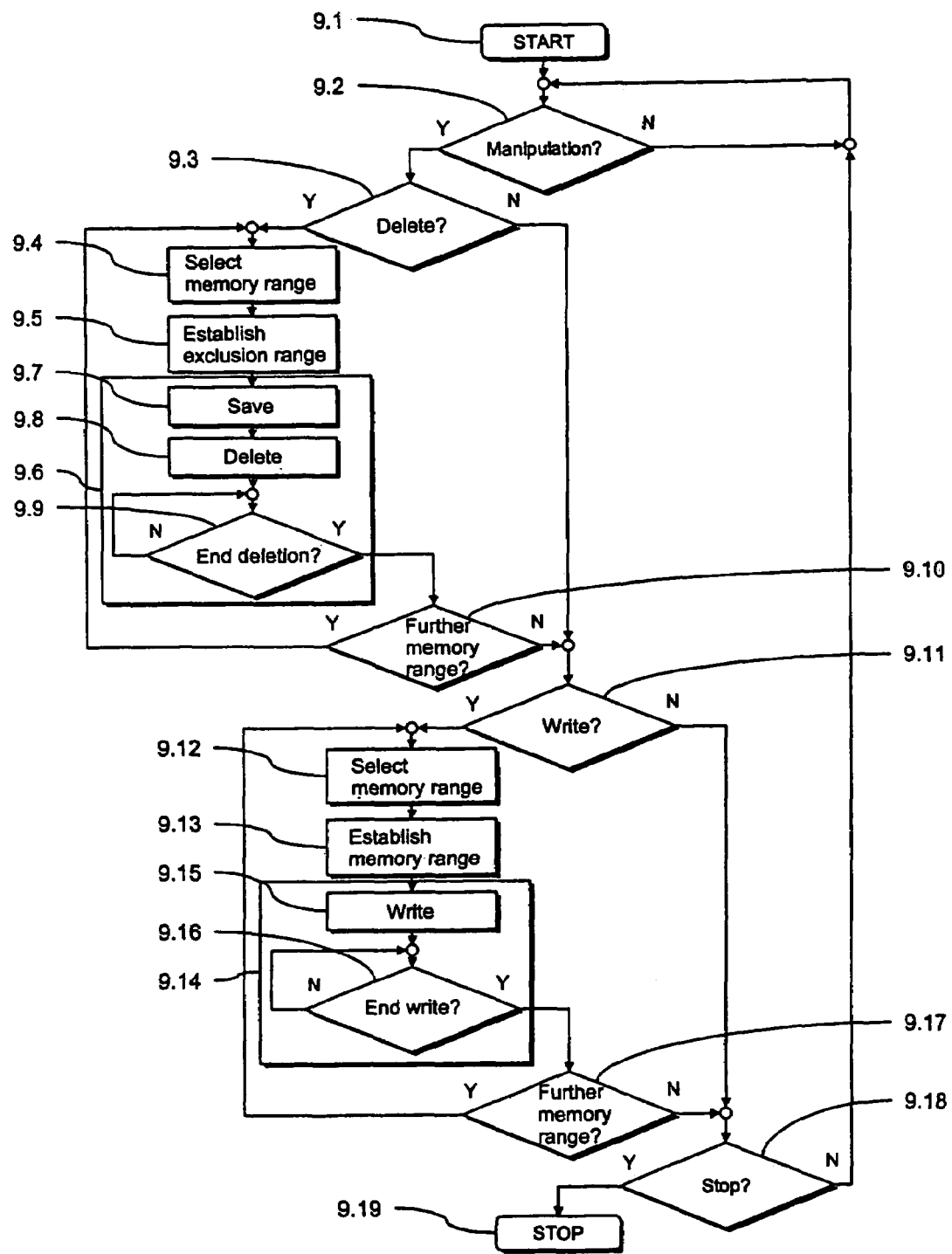
FIG. 3 is a flowchart of a further preferred embodiment of the inventive method for manipulation of a data memory that is implemented with the arrangement of FIG. 1.

In the following, a further preferred embodiment of the inventive method for manipulation of a data memory that can be implemented with the arrangement from FIG. 1 is described with reference to FIGS. 1 and 3.

The method workflow is initially started in a step 9.1. In a step 9.2, the processor 3 checks whether a manipulation of the flash module 5 should be effected. The manipulation of the flash module 5 can be both a deletion and a writing of all or specific memory ranges of the flash module 5.

Here as well the manipulation of the flash module 5 can again be initiated by an external command that was transferred to the processor 3 via an interface (not shown). Alternatively, an internal process in the security module 2 can trigger the manipulation of the flash module 5.

For example, if new data should be written into the flash module 5 in the framework of the manipulation, these are initially stored in the working memory 6. The address of the new data (thus the source address, the length of the new data and the target address of the new data in the flash module 5) are subsequently transferred to a flash driver. This flash driver is realized via the processor 3, which for this initially accesses a corresponding driver program in the program memory 7. In order to accelerate the processing, the processor 3 loads the required data into its cache memory 3.1.

In a step 9.3, it is initially determined whether a deletion of data is required corresponding to the manipulation request. As was explained above, only one complete sector of the flash module 5 must or can be deleted. The deletion can be omitted when, for example, it is known that the appertaining sectors are already provided in a deleted state or have never been written to.

In a step 9.4, the flash driver then initially determines which sector or sectors of the flash module 5 should be manipulated from the length of the new data and the target address of the new data in the flash module 5. The selection of the first memory range of the flash module 5 to be manipulated subsequently ensues via the processor 3. In the present example, this first memory range should be the first sector 5.1.

In an establishing step 9.5, the processor 3 establishes the exclusion range (thus the non-cacheable area) such that it includes the toggle bit 5.2 of the first sector 5.1. As described above, it is hereby achieved that, during the processing, the processor 3 does not determine the corresponding value from the cache memory 3.1 but instead actually accesses the toggle bit 5.2 of the first sector 5.1 in the flash module 5.

A deletion process of the first data that are stored in the first sector 5.1 then ensues in a subsequent first manipulation step 9.6. However, if in total only a first part of the first data of the first sector 5.1 is to be changed while a second part of the first data should remain unchanged, at least the second part of the first data is written into the working memory 6 (as a protective memory) in a protection step 9.7 of the first manipulation step 9.6. In order to avoid a data loss, for example given a failure of the deletion process etc., in the present case all first data are written into the working memory 6. In the case of an error, the old state can be reconstructed in this manner.

In other variants of the invention the protection step can be implemented in every case. Furthermore, it is understood that another storage, for example the cache memory 3.1, or even another sector of the flash module 5, can be used as a protective memory.

The deletion of the first sector 5.1, for which a corresponding deletion sequence is transmitted to the flash module 5 by the processor 3, then ensues in a step 9.8 of the first manipulation step 9.6.

In a step 9.9 of the first manipulation step 9.6, the processor 3 checks whether the deletion process of the first sector 5.1 has concluded. For this purpose, it accesses the toggle bit 5.2 of the first sector 5.1. As explained above, this toggle bit 5.2 represents a monitoring range of the first sector 5.1, the state progression of which allows the conclusion of the deletion event to be detected.

The establishment of the exclusion range (thus the non-cacheable area) that occurred in the establishing step 9.5 ensures that the processor 3 does not determine the corresponding value from the cache memory 3.1 but instead actually accesses the toggle bit 5.2 of the first sector 5.1 in the flash module 5.

If, using alternating states of the toggle bit 5.2, it is detected that the deletion process has not yet concluded, the deletion sequence is continued. Otherwise the processor 3 immediately ends the initiated deletion sequence and therewith the first manipulation step 9.6.

A reliable, early detection of the conclusion of the deletion process thus is made possible, such that the processing can be ended at the earliest possible point in time. Moreover, the cache memory 3.1 (with its advantages with regard to the achievable processing speed) is available during the entire processing. Overall a processing speed is therefore achieved that is normally at least twice as fast as the processing speed in the conventional methods with deactivation of the entire cache memory.

In a step 9.10, the processor 3 then checks whether a further second memory range (thus a further sector 5.3, 5.5, 5.7) of the flash module 5 is to be deleted according to the manipulation request. If this is the case, the workflow jumps back to step 9.4 in which the next sector 5.3, 5.5, 5.7 to be deleted of the flash module 5 is then selected, for which next sector the steps 9.4 and 9.6 are then implemented.

All sectors of the flash module 5 to be deleted according to the manipulation request are deleted in this manner. If in the step 9.10 it was determined that no further sector of the flash module 5 is to be manipulated, in a step 9.10 it is checked whether a write process is to be implemented.

If this is the case, in a step 9.12 the flash driver then initially determines which sector or sectors of the flash memory 5 the data should be written into. Then the processor 3 selects the first memory range of the flash module 5 to be written into first. In the present example, this first memory range is formed by the first sector 5.1.

In an establishing step 9.13, the processor 3 in turn establishes the exclusion range (thus the non-cacheable area) such that the processor actually accesses the toggle bit of the first sector 5.1 in the flash module 5 during the processing.

The writing in the first sector 5.1 then ensues in a subsequent second manipulation step 9.14. A write sequence for this is initiated in a step 9.15 of the second manipulation step 9.14. If overall only a first part of the first data of the first sector 5.1 should be altered while a second part of the first data should remain unchanged, on the one hand the second data which replace the first part of the first data to be modified and on the other hand the second part of the first data that should remain unchanged are written into the first sector 5.1 in the framework of the write sequence. The second part of the first data is reconstructed from the working memory 6 as a protective memory.

In a step 9.16 of the second manipulation step 9.14, the processor 3 checks whether the write process in the first sector 5.1 has concluded. Thanks to the specified establishment of the exclusion range (thus the non-cacheable area), for this said processor again directly accesses the toggle bit 5.2 of the first sector 5.1 as a monitoring range.

If, using alternating states of the toggle bit 5.2, it is detected that the write process has not yet concluded, the write sequence is continued. Otherwise the processor 3 immediately ends the initiated write sequence and therewith the second manipulation step 9.14.

A reliable, early detection of the conclusion of the write process is hereby again possible, such that the processing can be ended at the earliest possible point in time. Moreover, the cache memory 3.1 (with its advantages with regard to the achievable processing speed) is available during the entire processing. Overall a processing speed is therefore achieved that is normally at least twice as fast as the processing speed in the previously-known methods with deactivation of the entire cache memory.

In a step 9.17, the processor 3 then checks whether a further second memory range (thus a further sector 5.3, 5.5, 5.7) of the flash module 5 is to be written to according to the manipulation request. If this is the case, the workflow jumps back to step 9.12 in which the next sector 5.3, 5.5, 5.7 to be written to of the flash module 5 is then selected, for which next sector the steps 9.13 and 9.14 are then implemented.

All sectors of the flash module 5 to be written to according to the manipulation request are manipulated in this manner. If in the step 9.17 it was determined that no further sector of the flash module 5 is to be written to, in a step 9.18 it is finally checked whether the method workflow should be ended. If this is the case, the method workflow ends in a step 9.19. Otherwise the workflow jumps back to the step 9.2.

The present invention was described in the preceding using examples in which respectively only a single exclusion range was actually established and used. However, it is understood that, in other variants of the invention, a number of exclusion ranges (thus, for example, non-cacheable areas) can also be simultaneously established if applicable. If applicable, the establishing step then need only be implemented once for all appertaining memory ranges.

The present invention has been described using examples in which the inventive arrangement is realized with processing device and data memory integrated into a common unit. It is understood that the present invention also can be used in connection with any other configurations in which a corresponding data memory is detachably (and, if applicable, only temporarily) connected with the processing device. In particular the processing device can be executed as an external programming unit that is merely connected to the data memory for manipulation (for example programming) of the data memory.

The present invention was described in the preceding using the examples of a franking machine. It is understood that the present invention also can be used in connection with any other applications in which a flash memory or a comparably-operating memory type should be manipulated.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for manipulating data stored in a data memory comprising the steps of:
    in a manipulation step, accessing a memory with data stored therein in at least one memory range of said memory, with a data processing device having a buffer;
    during manipulation of said data in said manipulation step, monitoring a monitoring range of said memory range that exhibits a state progression allowing conclusion of the manipulation of the data in the memory range to be detected;
    prior to said manipulation step, in an establishing step, establishing an exclusion range of said memory that comprises said monitoring range; and
    during said manipulation step, reading data from said memory range, except for data in said exclusion range, into said buffer of said processing device.

2. A method as claimed in claim 1, comprising, in said manipulation step, deleting at least a portion of the data in said memory range from said memory range.

3. A method as claimed in claim 2 comprising ending deletion of said data from said memory range as soon as said conclusion of said manipulation is detected by the monitoring of said monitoring range.

4. A method as claimed in claim 1 wherein said processing device has access to a protective memory, and comprising reading at least a portion of the data in said memory range into said protective memory preceding said manipulation step.

5. A method as claimed in claim 4, comprising:
in said manipulation step, manipulating only a first portion of said data in said memory range, and maintaining a second portion of said data in said memory range unchanged; and
reading at least said second portion of said data in said memory range into said protective memory.

6. A method as claimed in claim 5 wherein said data in said memory range comprise first data, and comprising writing second data into said memory range of said data memory.

7. A method as claimed in claim 6 comprising:
in said manipulation step, writing said second data into said memory range for manipulation of said first portion of said first data; and
writing said second portion of said first data into said memory range from the protective memory for reconstruction.

8. A method as claimed in claim 7 comprising writing said second data into said memory range in a sub-step of said manipulation step, and ending said sub-step as soon as the conclusion of manipulation of said memory range is detected by the monitoring of said monitoring range.

9. A method as claimed in claim 1 wherein said data range is a first data range, and wherein said memory comprises a second data range, and wherein said exclusion range is a first exclusion range, and comprising:
in said establishing step, establishing a second exclusion range for said second memory range; and
in said manipulation step, reading data from said second memory range into said buffer except for data in said second exclusion range.

10. A method as claimed in claim 1 comprising employing a solid-state memory as said data memory.

11. A method as claimed in claim 10 comprising employing a flash memory as said solid-state memory.

12. A method as claimed in claim 11 comprising employing a sector of said flash memory as said memory range.

13. A method as claimed in claim 12 comprising employing at least one toggle bit of said sector of said flash memory as said monitoring region.

14. A method as claimed in claim 1 comprising employing a cache memory of said processing device as said buffer.

15. A method as claimed in claim 1 comprising incorporating at least one of said processing device and said data memory into a postal security module of a franking machine.

16. An arrangement for manipulating data stored in a data memory comprising:
a processing device having a buffer;
a memory, accessible by said processing device, with data stored therein in at least one memory range of said memory; and
said processing device, during manipulation of said data in a manipulation step, monitoring a monitoring range of said memory range that exhibits a state progression allowing conclusion of the manipulation of the data in the memory range to be detected, and prior to said manipulation step, in an establishing step, establishing an exclusion range of said memory that comprises said monitoring range, and during said manipulation step, reading data from said first memory range, except for data in said exclusion range, into said buffer of said processing device.

17. An arrangement as claimed in claim 16 wherein said processing device in said manipulation step, deletes at least a portion of the data in said memory range from said memory range.

18. An arrangement as claimed in claim 17 wherein said processing device ends said deletion of said data from said memory range as soon as said conclusion of said manipulation is detected by the monitoring of said monitoring range.

19. An arrangement as claimed in claim 16 comprising a protective memory accessible by said processing device wherein said processing device reads at least a portion of the data in said memory range into said protective memory preceding said manipulation step.

20. An arrangement as claimed in claim 19, wherein said processing device, in said manipulation step, manipulates only a first portion of said data in said memory range, and maintains a second portion of said data in said memory range unchanged, and reads at least said second portion of said data in said memory range into said protective memory.

21. An arrangement as claimed in claim 20 wherein said data in said memory range comprise first data, and wherein said processing device writes second data into said memory range of said data memory.

22. An arrangement as claimed in claim 21 wherein said processing device, in said manipulation step, writes said second data into said memory range for manipulation of said first portion of said first data, and writes said second portion of said first data into said memory range from the protective memory for reconstruction.

23. An arrangement as claimed in 22 wherein said processing device writes said second data into said memory range in a sub-step of said manipulation step, and ends said sub-step as soon as the conclusion of manipulation of said memory range is detected by the monitoring of said monitoring range.

24. An arrangement as claimed in claim 16 wherein said data range is a first data range, and wherein said memory comprises a second data range, and wherein said exclusion range is a first exclusion range, and wherein said processing device, in said establishing step, establishes a second exclusion range for said second memory range, and in said manipulation step, reads data from said second memory range into said buffer except for data in said second exclusion range.

25. An arrangement as claimed in claim 24 wherein said data memory is solid-state memory.

26. An arrangement as claimed in claim 25 wherein said solid-state memory is a flash memory.

27. An arrangement as claimed in claim 26 wherein said flash memory has a sector, and wherein said processing device employs said sector of said flash memory as said memory range.

28. An arrangement as claimed in claim 27 wherein a sector of said flash memory has a toggle bit, and wherein said processing device employs said at least one toggle bit of said sector of said flash memory as said monitoring region.

29. An arrangement as claimed in claim 16 wherein said buffer is a cache memory of said processing device.

30. A franking machine comprising:
a processing device having a buffer;
a memory, accessible by said processing device, with data stored therein in at least one memory range of said memory;
a postal security module in which at least one of said processing device and said memory is contained; and said processing device, during manipulation of said data in a manipulation step, monitoring a monitoring range of said memory range that exhibits a state progression allowing conclusion of the manipulation of the data in the memory range to be detected, and prior to said manipulation step, in an establishing step, establishing an exclusion range of said memory that comprises said monitoring range, and during said manipulation step, reading data from said first memory range, except for data in said exclusion range, into said buffer of said processing device.

* * * * *